US012502332B2

(12) United States Patent
Huang et al.

(10) Patent No.: US 12,502,332 B2
(45) Date of Patent: Dec. 23, 2025

(54) AIR PASSAGE UNIT, AIR PASSAGE SYSTEM, POOL BODY, AND MASSAGING POOL

(71) Applicant: Intex Marketing Ltd., Tortola (VG)

(72) Inventors: Zhi Xiong Huang, Fujian (CN); Ai Ming Tan, Fujian (CN)

(73) Assignee: Intex Marketing Ltd., Tortola (VG)

( * ) Notice: Subject to any disclaimer, the term of this patent is extended or adjusted under 35 U.S.C. 154(b) by 233 days.

(21) Appl. No.: 18/027,147

(22) PCT Filed: Sep. 29, 2021

(86) PCT No.: PCT/IB2021/058875

§ 371 (c)(1),
(2) Date: Mar. 20, 2023

(87) PCT Pub. No.: WO2022/070045

PCT Pub. Date: Apr. 7, 2022

(65) Prior Publication Data

US 2023/0329966 A1 Oct. 19, 2023

(30) Foreign Application Priority Data

Sep. 29, 2020 (CN) ......................... 202011056895.2
Sep. 29, 2020 (CN) ......................... 202022193576.8
Sep. 29, 2020 (CN) ......................... 202022193580.4

(51) Int. Cl.
*A61H 33/02* (2006.01)

(52) U.S. Cl.
CPC ......... *A61H 33/026* (2013.01); *A61H 33/028* (2013.01); *A61H 2033/021* (2013.01)

(58) Field of Classification Search
CPC ...... A61H 9/005; A61H 9/0071; A61H 33/02; A61H 33/026; A61H 33/028;
(Continued)

(56) References Cited

U.S. PATENT DOCUMENTS 4,566,443 A 1/1986 Bucher
4,773,104 A 9/1988 Wang
(Continued)

FOREIGN PATENT DOCUMENTS

CN 1596864 3/2005
CN 2794505 7/2006
(Continued)

OTHER PUBLICATIONS

International Preliminary Report on Patentability issued by The International Bureau of WIPO, for International Patent Application No. PCT/IB2021/058875, issued Apr. 13, 2023; 9 pages.
(Continued)

*Primary Examiner* — Tuan N Nguyen
(74) *Attorney, Agent, or Firm* — Faegre Drinker Biddle & Reath LLP

(57) ABSTRACT

The present disclosure discloses an air passage unit for a massaging pool. The air passage unit comprises an air passing portion, a first air connecting portion, and a first fastening structure. The first air connecting portion comprises two first air connecting openings configured to be in communication with the air passing portion, the first fastening structure is configured to be detachably connected to the massaging pool, and the two first air connecting openings are disposed on the first fastening structure so as to enable the two first air connecting openings to be synchronously connected to or detached from the massaging pool through the first fastening structure being connected to or detached from the massaging pool. The present disclosure further discloses an air passage system for a massaging pool. The air passage system comprises an air pump, and an air passage unit. The air passage unit comprises an air passing portion, a first air connecting portion, and a control mechanism. The air passage unit is configured to be alternatively in an
(Continued)

inflated state or an exhausted state. When the air passage unit is in the inflated state, a first passing passage is in communication with external air, and a second air passing passage is in communication with the first air connecting portion. When the air passage unit is in the exhausted state, the first air connecting portion is in communication with the first air passing passage through the control mechanism, and the second air passing passage is in communication with the external air through the control mechanism.

29 Claims, 13 Drawing Sheets

(58) Field of Classification Search
CPC ...... A61H 2201/0103; A61H 2033/021; A61H 2033/022
USPC .................... 4/492, 509, 541.1, 541.4, 541.5
See application file for complete search history.

(56) References Cited

U.S. PATENT DOCUMENTS

| | | | | |
|---|---|---|---|---|
| 4,981,543 | A | 1/1991 | Popovich | |
| 5,283,915 | A | 2/1994 | Idland | |
| 5,809,942 | A | 9/1998 | Kralovec | |
| 6,003,166 | A | 12/1999 | Hald | |
| 6,108,829 | A | 8/2000 | Wadsworth | |
| 6,199,224 | B1 | 3/2001 | Versland | |
| 6,357,059 | B1 | 3/2002 | Lau | |
| 6,412,123 | B1 | 7/2002 | Lau | |
| 7,334,274 | B2 | 2/2008 | Wang | |
| 2002/0029414 | A1 | 3/2002 | Shun Lau | |
| 2005/0050627 | A1 | 3/2005 | Ayeni | |
| 2006/0115248 | A1 | 6/2006 | Tran | |
| 2006/0260038 | A1 | 11/2006 | Lau | |
| 2009/0241252 | A1 | 10/2009 | Li | |
| 2010/0146696 | A1 * | 6/2010 | Campbell | E04H 4/1236 4/541.1 |
| 2011/0010836 | A1 | 1/2011 | Lau | |
| 2012/0124732 | A1 | 5/2012 | Lau | |
| 2015/0020306 | A1 | 1/2015 | Lin et al. | |
| 2018/0231283 | A1 | 8/2018 | Willers | |
| 2019/0175445 | A1 | 6/2019 | Hsu et al. | |
| 2022/0241148 | A1 | 8/2022 | Wang | |
| 2022/0325546 | A1 | 10/2022 | Lin | |

FOREIGN PATENT DOCUMENTS

| | | | |
|---|---|---|---|
| CN | 201396299 | | 2/2010 |
| CN | 202732280 | | 2/2013 |
| CN | 103574207 | | 2/2014 |
| CN | 204174973 | | 2/2015 |
| CN | 205077913 | | 3/2016 |
| CN | 207314924 | | 5/2018 |
| CN | 208319114 | | 1/2019 |
| CN | 109424221 | | 3/2019 |
| CN | 210858153 | | 6/2020 |
| CN | 111895140 | | 11/2020 |
| CN | 112502498 | | 3/2021 |
| EP | 0967446 | | 12/1999 |
| JP | 4041132 | | 1/2008 |
| WO | 2015010058 | | 1/2015 |
| WO | 2015/085227 | | 6/2015 |
| WO | 2015/085227 | A8 | 1/2016 |
| WO | 2016105488 | A1 | 6/2016 |
| WO | 2020/038090 | A1 | 2/2020 |

OTHER PUBLICATIONS

European Search Report for EP Patent Application No. 21874690.7, Issued on Sep. 26, 2024, 7 pages.
International Search Report and Written Opinion as issued by the International Searching Authority, dated Jan. 13, 2022, for International Patent Application No. PCT/IB2021/058875; 11 pages.

* cited by examiner

AIR PASSAGE UNIT, AIR PASSAGE SYSTEM, POOL BODY, AND MASSAGING POOL

RELATED APPLICATIONS

The present application is a national stage entry of International (PCT) Patent Application Number PCT/IB2021/058875, filed Sep. 29, 2021, which claims priority to Chinese patent application number 202011056895.2, filed on Sep. 29, 2020; Chinese utility model application number 202022193580.4, filed on Sep. 29, 2020; and Chinese utility model application number 202022193576.8, filed on Sep. 29, 2020, the entire disclosures of which are explicitly incorporated herein by reference.

FIELD OF THE DISCLOSURE

The present disclosure relates to a technical field of inflatable bathing/swimming structures such as pools and tubs which may feature massaging bubbles (e.g., spas, swim spas, etc.), and a technical field of massaging pool accessories, and in particular relates to an air passage unit for a massaging pool, an air passage system for a massaging pool, an air passage system for a massaging pool, a pool body for a massaging pool, and a massaging pool.

BACKGROUND OF THE DISCLOSURE

There exists a massaging pool that comprises a pool body and an air passage system. An air cavity is defined within the pool body, and the pool body comprises a first one of two air connecting openings. The pool body surrounds to define a pool cavity, and the pool body comprises a first one of the two air connecting openings configured to be in communication with the pool body for inflation thereof and a second one of the two air connecting openings configured to be in communication with the pool cavity and cooperating with the pool cavity to generate massage bubbles. The air passage system comprises two pump bodies, and the two pump bodies are respectively connected to the two air connecting openings through two air passage units. The two air passage units are respectively connected to or detached from the two air connecting openings. Therefore, in a use process, a user needs to connect twice or remove it twice, which is cumbersome to use, and there is a need for further improvement.

There exists a massaging pool that comprises a pool body and an air passage system. An air cavity is defined within the pool body, and the pool body comprises an air inlet port that is in communication with the air cavity. The air passage system comprises a pump body that is in communication with the air inlet port through an air passage unit, and the air passage unit comprises an inflation port and a suction port. During an inflation process, the inflation port is in communication with the air inlet port. During a suction process, the suction port is in communication with the air inlet port. Therefore, when inflating or pumping air, users need to use different ports (i.e., the inflation port and the suction port) to be connected to the air inlet port, which is cumbersome to use, and there is a need for further improvement.

It is with respect to these and other general considerations that embodiments have been described. Also, although relatively specific problems have been discussed, it should be understood that the embodiments should not be limited to solving the specific problems identified in the background.

BRIEF SUMMARY OF THE DISCLOSURE

The present disclosure provides an air passage unit for a massaging pool such as a spa (e.g., a lounging spa or swim spa), an air passage system for a massaging pool, an air passage system for a massaging pool, a pool body for a massaging pool and a massaging pool. Generally, “spa” or “massaging pool” refers to any body capable of containing occupants and a fluid such as water while generating bubbles in the fluid.

In accordance with the present disclosure, there is provided an air passage unit for a pool, preferably for a massaging pool. The air passaging unit may comprise an air passing portion. The air passaging unit may comprise a first air connecting portion. The air passaging unit may comprise a first fastening structure. The first air connecting portion may comprise two first air connecting openings configured to be in communication with the air passing portion. The first fastening structure may be configured to be detachably connected to the pool. The two first air connecting openings may be disposed on the first fastening structure so as to enable the two first air connecting openings to be synchronously connected to or detached from the pool through the first fastening structure being connected to or detached from the pool.

In an optional embodiment, the air passage unit comprises a switching valve. The switching valve may cooperate with the air passing portion and the two first air connecting openings to at least switch the two first air connecting openings to be alternatively in communication with the air passing portion.

In an optional embodiment, the switching valve comprises a valve core configured to be slidingly connected to the air passage unit, and the valve core is configured to slide to achieve switching abovementioned.

In an optional embodiment, the switching valve comprises a valve core configured to be rotatably connected to the air passage unit, and the valve core is configured to rotate to achieve switching abovementioned.

In an optional embodiment, the air passage unit comprises a mounting seat. The switching valve comprises an operating member, and the operating member is connected to the mounting seat to drive the valve core.

In an optional embodiment, the two first air connecting openings are fixedly connected to each other.

In an optional embodiment, the first fastening structure comprises a first joint portion, the first joint portion comprises an inner joint and an outer joint sleeved outside of the inner joint, the inner joint defines a first one of the two first air connecting openings, and a second one of the two first air connecting openings is define by a gap between the inner joint and the outer joint.

In an optional embodiment, the first fastening structure comprises a first joint portion, the first joint portion comprises two joints juxtapositionally secured with each other, and the two joints respectively define the two first air connecting openings.

In an optional embodiment, the first fastening structure comprises an outer joint, and the two joints are fixedly disposed in the outer joint.

In an optional embodiment, the first fastening structure further comprises an outer fastening sleeve configured to be connected to or detached from the massaging pool, and the first joint portion is configured to be connected to or detached from the massaging pool through the outer fastening sleeve being connected to or detached from the massaging pool.

In an optional embodiment, the air passage unit comprises a switching valve and a mounting seat. The switching valve comprises a valve core and an operating member, and the switching valve cooperates with the air passing portion and the two first air connecting openings to at least switch the two first air connecting openings to be alternatively in communication with the air passing portion. The operating member is operatively coupled to the valve core to drive the valve core, and the first joint portion and the air passing portion are fixedly connected to each other. A portion at which the first joint portion is connected to the air passing portion defines the mounting seat, and the operating member is connected to the mounting seat.

In an optional embodiment, the air passage unit comprises a control mechanism. The air passing portion comprises a first air passing passage and a second air passing passage, and the control mechanism cooperates with the first air passing passage, the second air passing passage, and the first air connecting portion, so that the air passage unit is configured to be alternatively in an inflated state or an exhausted state which is configured to be selected through the control mechanism. When the air passage unit is in the inflated state, the first passing passage is in communication with external air, and the second air passing passage is in communication with the first air connecting portion. When the air passage unit is in the exhausted state, the first air connecting portion is in communication with the first air passing passage through the control mechanism, and the second air passing passage is in communication with the external air through the control mechanism.

In an optional embodiment, the control mechanism comprises an air inlet path, an air exhaust path, and an air connecting path. When the air passage unit is in the inflated state, the first air passing passage is in communication with the external air through the air inlet path, and the second air passing passage is in communication with the first air connecting portion. When the air passage unit is in the exhausted state, the first air connecting portion is in communication with the first air passing passage through the air connecting path, and the second air passing passage is in communication with the external air through the air exhaust path.

In an optional embodiment, the control mechanism comprises an on-off portion, and the on-off portion is disposed between the first air connecting portion and the second air passing passage to control a turning ON and OFF of air between the first air connecting portion and the second air passing passage. When the air passage unit is in the inflated state, the on-off portion is open to enable the first air connecting portion to be in communication with the second air passing passage. When the air passage unit is in the exhausted state, the on-off portion is closed to block the first air connecting portion from being in communication with the second air passing passage.

In an optional embodiment, the control mechanism comprises a rotating seat, and the on-off portion is fixedly connected to the rotating seat. The rotating seat comprises the air inlet path penetrating therethrough, and an outer wall of the rotating seat comprises two notches respectively defining the air exhaust path and the air connecting path.

In an optional embodiment, the air passage unit comprises amounting chamber, and the mounting chamber is defined between the air passing portion and the second air passing passage. A periphery of a chamber opening of the mounting chamber extends outward to define a mounting surrounding wall, and the rotating seat is rotatably connected to the mounting surrounding wall. The on-off portion is inserted into the mounting chamber, and an end port of the first air passing passage penetrates through the mounting surrounding wall. The mounting surrounding wall comprises an air connecting opening penetrating therethrough, and the rotating seat rotates to control the air passage unit to be alternatively in the inflated state or the exhausted state. When the air passage unit is in the inflated state, the air connecting opening is in communication with the first air passing passage through the air inlet path, and the rotating seat seals the chamber opening of the mounting chamber. When the air passage unit is in the exhausted state, the first air connecting portion is in communication with the first air passing passage through the air connecting path, and the second air passing passage is in communication with the air connecting opening through the air exhaust path.

In an optional embodiment, the end port of the first air passing passage and air connecting opening are located on two positions of the mounting surrounding wall which are symmetrical along a radial direction of the mounting surrounding wall.

In the present disclosure, there is provided an air passage system for a massaging pool comprises an air pump and the air passage unit, and the air pump is connected to the air passing portion.

In the present disclosure, there is provided an air passage system for a massaging pool comprises an air pump and the air passage unit, and the air pump is connected to the first air passing passage and the second air passing passage, In the present disclosure, there is provided a pool body for a massaging pool comprises an air cavity, a pool cavity, and two second air connecting openings, and a second fastening structure. The air cavity may be defined within the pool body, and a first one of the two second air connecting openings may be configured to be in communication with the air cavity. The pool body surrounds to define the pool cavity, and a second one of the two second air connecting openings may be configured to be in communication with the pool cavity and cooperates with the pool cavity to generate the massage bubbles. The two second air connecting openings may be disposed on the second fastening structure, and the two second air connecting openings may be synchronously respectively connected to or detached from an air passage system through the second fastening structure being connected to or detached from the air passage system.

In the present disclosure, there is provided a massaging pool comprises a pool body, an air pump, and an air passage unit. An air cavity may be defined within the pool body, and the pool body comprises a first one of the two second air connecting openings configured to in communication with the air cavity. The pool body may surround to define a pool cavity, and the pool body may comprise a second one of the two second air connecting openings configured to be in communication with the pool cavity and cooperating with the pool cavity to generate the massage bubbles. The air pump may be connected to the air passing portion, and the pool body may comprise a second fastening structure. The two second air connecting openings may be disposed on the second fastening structure, and the two first air connecting openings may be synchronously respectively connected to or detached from the two second air connecting openings through the second fastening structure being connected to or detached from the first fastening structure.

Compared with the existing techniques, the technical solutions presented by the present disclosure provides the following advantages.

The two first air connecting openings are disposed on the first fastening structure so as to enable the two first air connecting openings to be synchronously connected to or detached from the massaging pool through the first fastening structure being connected to or detached from the massaging pool. By assembling and disassembling the first fastening structure, the two first air connecting openings can be synchronously connected to or detached from the massaging pool, so that the two first air connecting openings can be connected or disconnected through a single operation step, which improves assembly efficiency, convenience, and accuracy.

The switching valve at least switches the two first air passing openings to be alternatively communication with the air passing portion, so as to realize that a single air pump supplies air to the air cavity and supplies massage bubbles to the pool cavity.

The switching valve comprises the operating member, and the operating member is connected to the mounting seat to drive the valve core, which has a compact structure.

The two first air connecting openings are fixedly connected to each other, which is easy to detach.

The first one of the two first air connecting openings is defined in the inner joint, and the second one of the two first air connecting openings is defined by a gap between the inner joint and the outer joint, which has a simple structure, is convenient to install, and has a stable and reliable ventilation.

The control mechanism can achieve inflating and exhausting, which is convenient to operate and has a compact structure. When the air passage unit is in the inflated state, the first passing passage is in communication with external air, and the second air passing passage is in communication with the first air connecting portion. When the air passage unit is in the exhausted state, the first air connecting portion is in communication with the first air passing passage through the control mechanism, and the second air passing passage is in communication with the external air through the control mechanism. In this way, the air pump can achieve inflating and suction of the air cavity of the massaging pool.

The control mechanism comprises the air inlet path, the air exhaust path, and the air connecting path. When the air passage unit is in the inflated state, the first air passing passage is in communication with the external air through the air inlet path, and the second air passing passage is in communication with the first air connecting portion. When the air passage unit is in the exhausted state, the first air connecting portion is in communication with the first air passing passage through the air connecting path, and the second air passing passage is in communication with the external air through the air exhaust path. The control mechanism is easy to control, has a reasonable layout, and has a compact structure.

The rotating seat is rotatably connected to the mounting surrounding wall, and the on-off portion is inserted into the mounting chamber, and the rotating seat rotates to control the air passage unit to be alternatively in the inflated state or the exhausted state. When the air passage unit is in the inflated state, the air connecting opening is in communication with the first air passing passage through the air inlet path, and the rotating seat seals the chamber opening of the mounting chamber. When the air passage unit is in the exhausted state, the first air connecting portion is in communication with the first air passing passage through the air connecting path, and the second air passing passage is in communication with the air connecting opening through the air exhaust path. The rotating seat has a reasonable layout, and has a compact structure.

The two second air connecting openings are disposed on the second fastening structure, and the two second air connecting openings are synchronously respectively connected to or detached from an air passage system through the second fastening structure being connected to or detached from the air passage system, which improves assembly efficiency, convenience, and accuracy.

In the present disclosure, there is provided an air passage system for a massaging pool comprises an air pump, and an air passage unit. The air passage unit may comprise an air passing portion, a first air connecting portion, and a control mechanism. The air passing portion may comprise a first air passing passage and a second air passing passage, and the air pump may be connected to the first air passing passage and the second air passing passage. The control mechanism may cooperate with the first air passing passage, the second air passing passage, and the first air connecting portion, so that the air passage unit is configured to be alternatively in an inflated state or an exhausted state which is configured to be selected through the control mechanism. When the air passage unit is in the inflated state, the first passing passage may be in communication with external air, and the second air passing passage may be in communication with the first air connecting portion. When the air passage unit is in the exhausted state, the first air connecting portion may be in communication with the first air passing passage through the control mechanism, and the second air passing passage may be in communication with the external air through the control mechanism.

In an optional embodiment, the control mechanism may comprise an air inlet path, an air exhaust path, and an air connecting path. When the air passage unit is in the inflated state, the first air passing passage may be in communication with the external air through the air inlet path, and the second air passing passage is in communication with the first air connecting portion. When the air passage unit is in the exhausted state, the first air connecting portion is in communication with the first air passing passage through the air connecting path, and the second air passing passage is in communication with the external air through the air exhaust path.

In an optional embodiment, the control mechanism comprises an on-off portion, and the on-off portion is disposed between the first air connecting portion and the second air passing passage to control a turning ON and OFF of air between the first air connecting portion and the second air passing passage. When the air passage unit is in the inflated state, the on-off portion is open to enable the first air connecting portion to be in communication with the second air passing passage. When the air passage unit is in the exhausted state, the on-off portion is closed to block the first air connecting portion from being in communication with the second air passing passage.

In an optional embodiment, the control mechanism comprises a rotating seat, and the on-off portion is fixedly connected to the rotating seat. The rotating seat comprises the air inlet path penetrating therethrough, and an outer wall of the rotating seat comprises two notches respectively defining the air exhaust path and the air connecting path.

In an optional embodiment, the air passage system comprises a mounting chamber. The mounting chamber is defined between the air passing portion and the second air passing passage, and a periphery of a chamber opening of the mounting chamber extends outward to define a mounting surrounding wall. The rotating seat is rotatably connected to the mounting surrounding wall, and the on-off portion is inserted into the mounting chamber. An end port of the first air passing passage penetrates through the mounting surrounding wall, the mounting surrounding wall comprises an air connecting opening penetrating therethrough, and the rotating seat rotates to control the air passage unit to be alternatively in the inflated state or the exhausted state. When the air passage unit is in the inflated state, the air connecting opening is in communication with the first air passing passage through the air inlet path, and the rotating seat seals the chamber opening of the mounting chamber. When the air passage unit is in the exhausted state, the first air connecting portion is in communication with the first air passing passage through the air connecting path, and the second air passing passage is in communication with the air connecting opening through the air exhaust path.

In an optional embodiment, the end port of the first air passing passage and air connecting opening are located on two positions of the mounting surrounding wall which are symmetrical along a radial direction of the mounting surrounding wall.

In an optional embodiment, the first air connecting portion comprises a first air connecting opening.

In the present disclosure, there is provided a massaging pool comprising a pool body, and an air passage system. An air cavity may be defined within the pool body, and the pool body may comprise a second air connecting openings. The air passage system may comprise an air pump and an air passage unit, and the air passage unit may comprise an air passing portion, a first air connecting portion, and a control mechanism. The air passing portion may comprise a first air passing passage and a second air passing passage, and the air pump is connected to the first air passing passage and the second air passing passage. The control mechanism may cooperate with the first air passing passage, the second air passing passage, and the first air connecting portion, so that the air passage unit is configured to be alternatively in an inflated state or an exhausted state which is configured to be selected through the control mechanism. The first air connecting portion may comprise a first air connecting opening, and the first air connecting opening may be configured to be connected to the second air connecting opening. When the air passage unit is in the inflated state, the first passing passage may be in communication with external air, and the second air passing passage may be in communication with the first air connecting portion. When the air passage unit is in the exhausted state, the first air connecting portion may be in communication with the first air passing passage through the control mechanism, and the second air passing passage may be in communication with the external air through the control mechanism.

Compared with the existing techniques, the technical solutions presented by the present disclosure provides the following advantages.

The control mechanism can achieve inflating and exhausting, which is convenient to operate and has a compact structure. When the air passage unit is in the inflated state, the first passing passage is in communication with external air, and the second air passing passage is in communication with the first air connecting portion. When the air passage unit is in the exhausted state, the first air connecting portion is in communication with the first air passing passage through the control mechanism, and the second air passing passage is in communication with the external air through the control mechanism. In this way, the air pump can achieve inflating and suction of the air cavity of the massaging pool.

The control mechanism comprises the air inlet path, the air exhaust path, and the air connecting path. When the air passage unit is in the inflated state, the first air passing passage is in communication with the external air through the air inlet path, and the second air passing passage is in communication with the first air connecting portion. When the air passage unit is in the exhausted state, the first air connecting portion is in communication with the first air passing passage through the air connecting path, and the second air passing passage is in communication with the external air through the air exhaust path. The control mechanism is easy to control, has a reasonable layout, and has a compact structure.

The rotating seat is rotatably connected to the mounting surrounding wall, and the on-off portion is inserted into the mounting chamber, and the rotating seat rotates to control the air passage unit to be alternatively in the inflated state or the exhausted state. When the air passage unit is in the inflated state, the air connecting opening is in communication with the first air passing passage through the air inlet path, and the rotating seat seals the chamber opening of the mounting chamber. When the air passage unit is in the exhausted state, the first air connecting portion is in communication with the first air passing passage through the air connecting path, and the second air passing passage is in communication with the air connecting opening through the air exhaust path. The rotating seat has a reasonable layout, and has a compact structure.

DETAILED DESCRIPTION OF THE EMBODIMENTS

Figure 1:
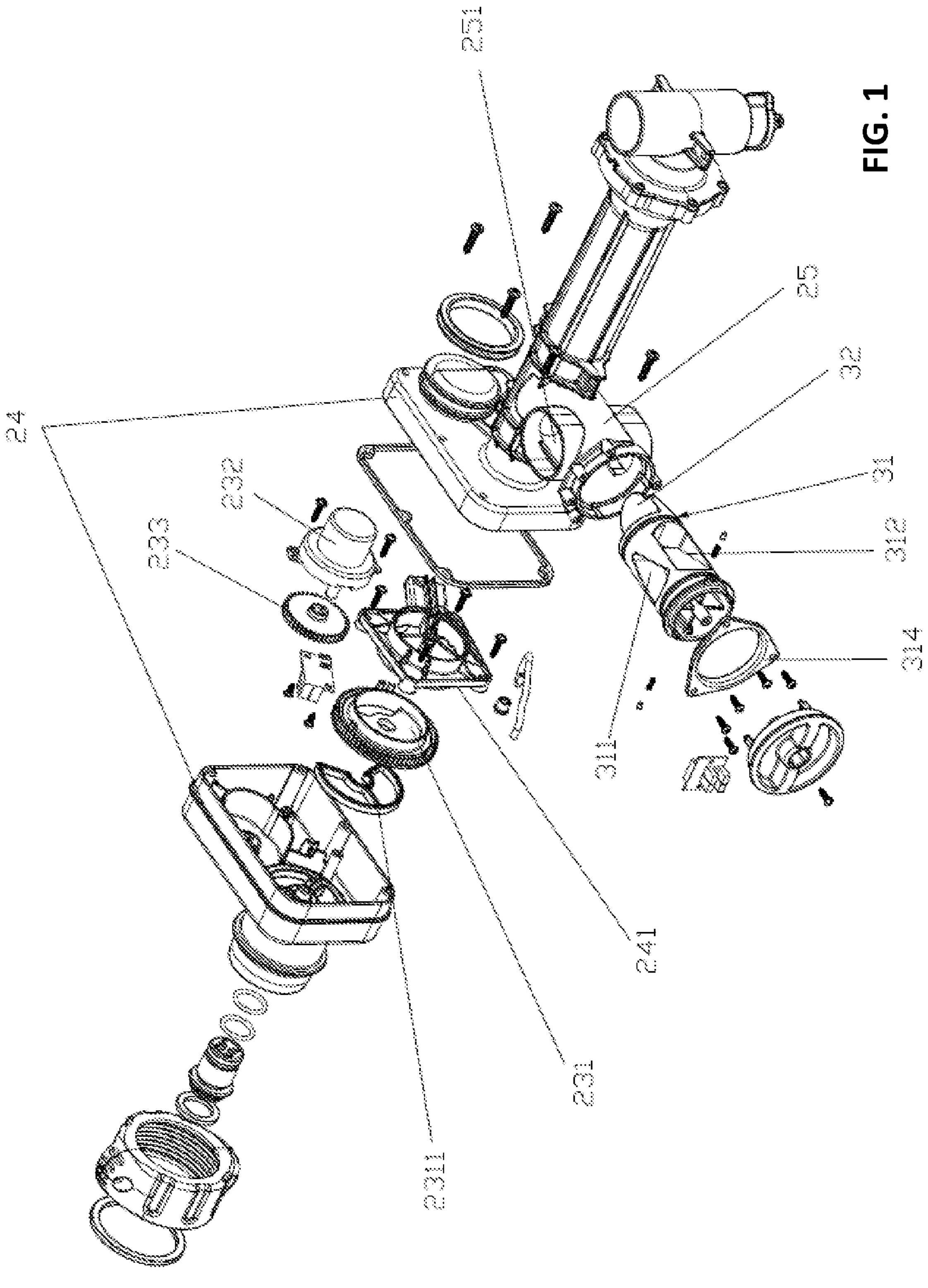
FIG. 1 illustrates an exploded view of an air passage system in Embodiment 1.
Figure 2:
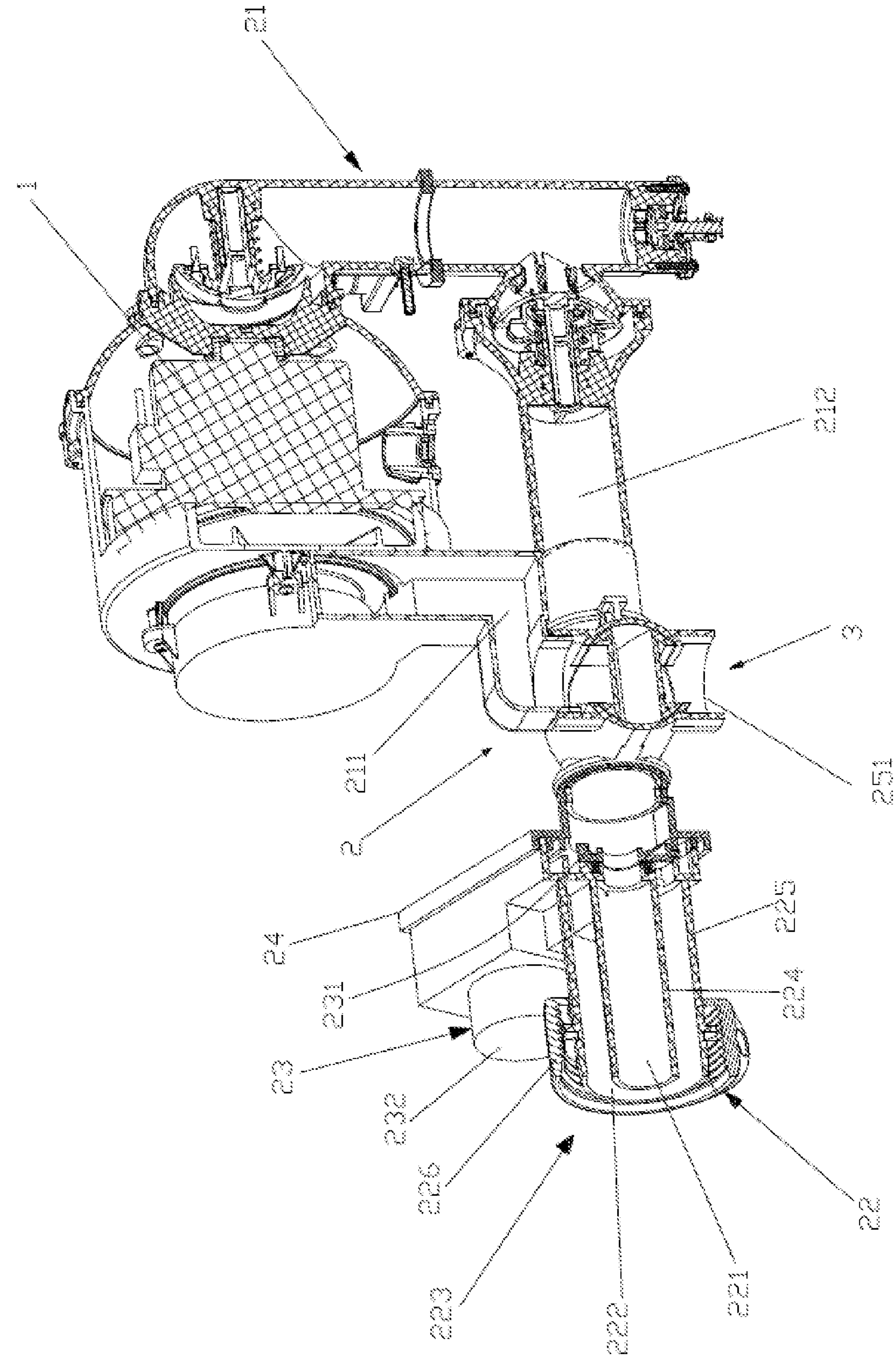
FIG. 2 illustrates a perspective view of the air passage system with a section of an exterior of the passage system removed in Embodiment 1.
Figure 3:
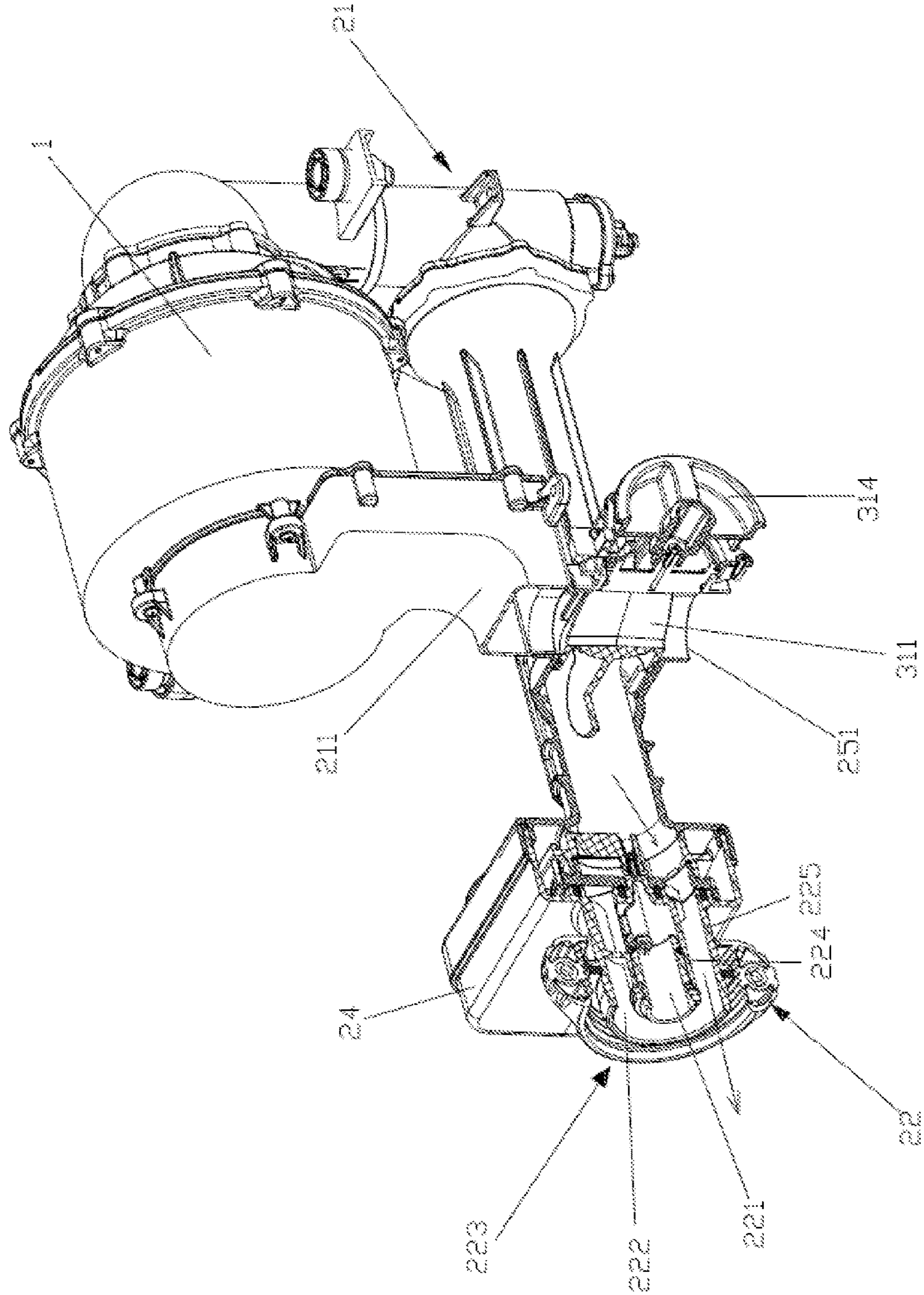
FIG. 3 illustrates a first perspective view of the air passage system with a section of an exterior of the passage system removed, illustrating a second one of two first air connecting openings being open in Embodiment 1.
Figure 4:
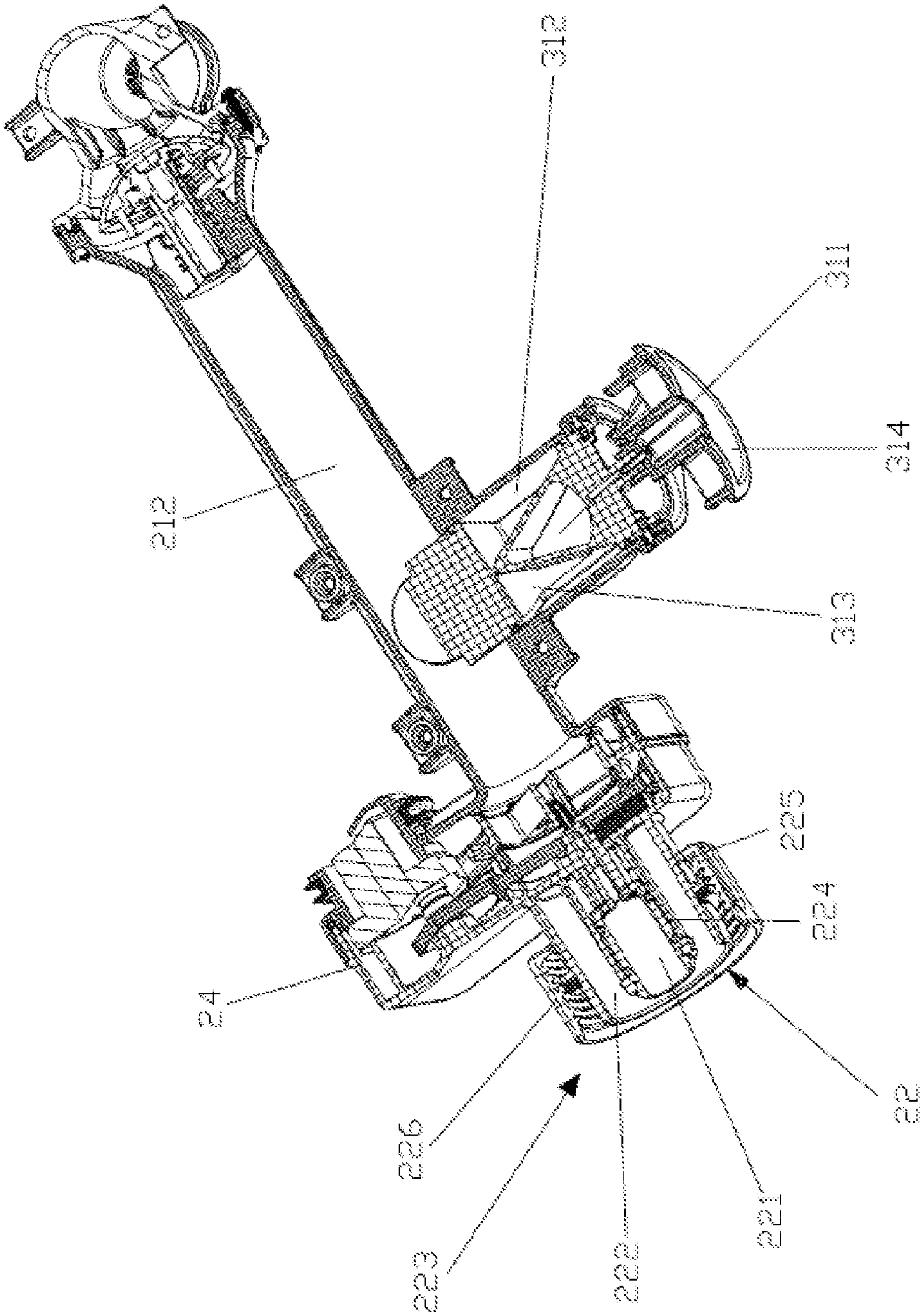
FIG. 4 illustrates a second perspective view of the air passage system with a section of an exterior of the passage system removed, illustrating the second one of the two first air connecting openings being open in Embodiment 1.
Figure 6:
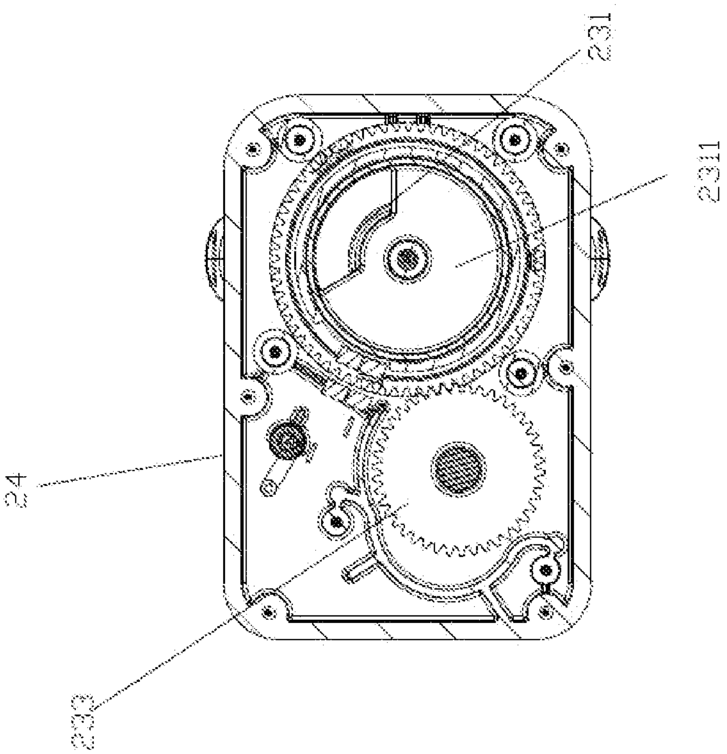
FIG. 6 illustrates a cross-section view of the air passage system, illustrating a switching valve in Embodiment 1.
Figure 5:
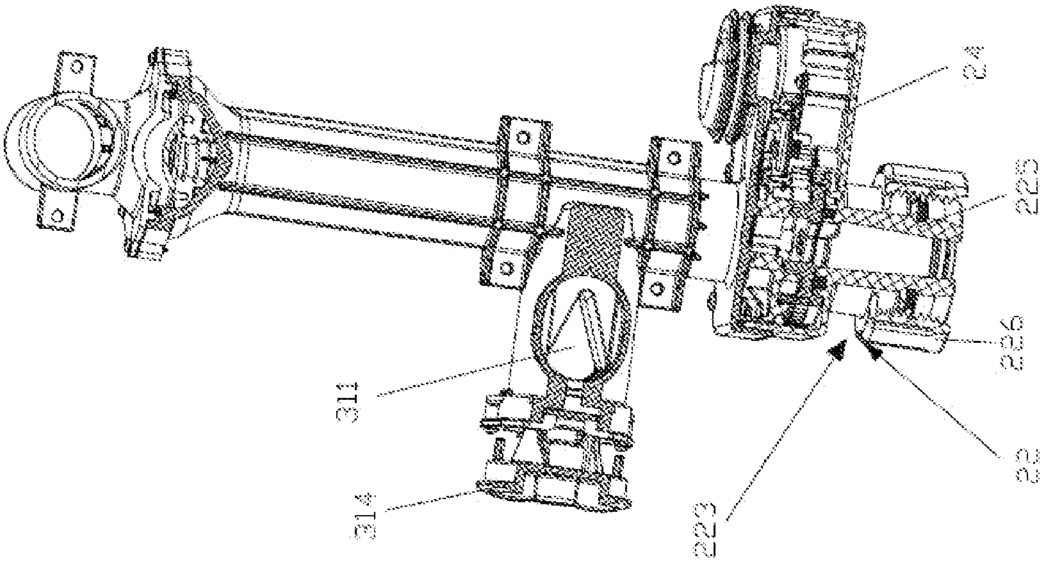
FIG. 5 illustrates a third perspective view of the air passage system with a section of an exterior of the passage system removed, illustrating the second one of the two first air connecting openings being open in Embodiment 1.
Figure 7:
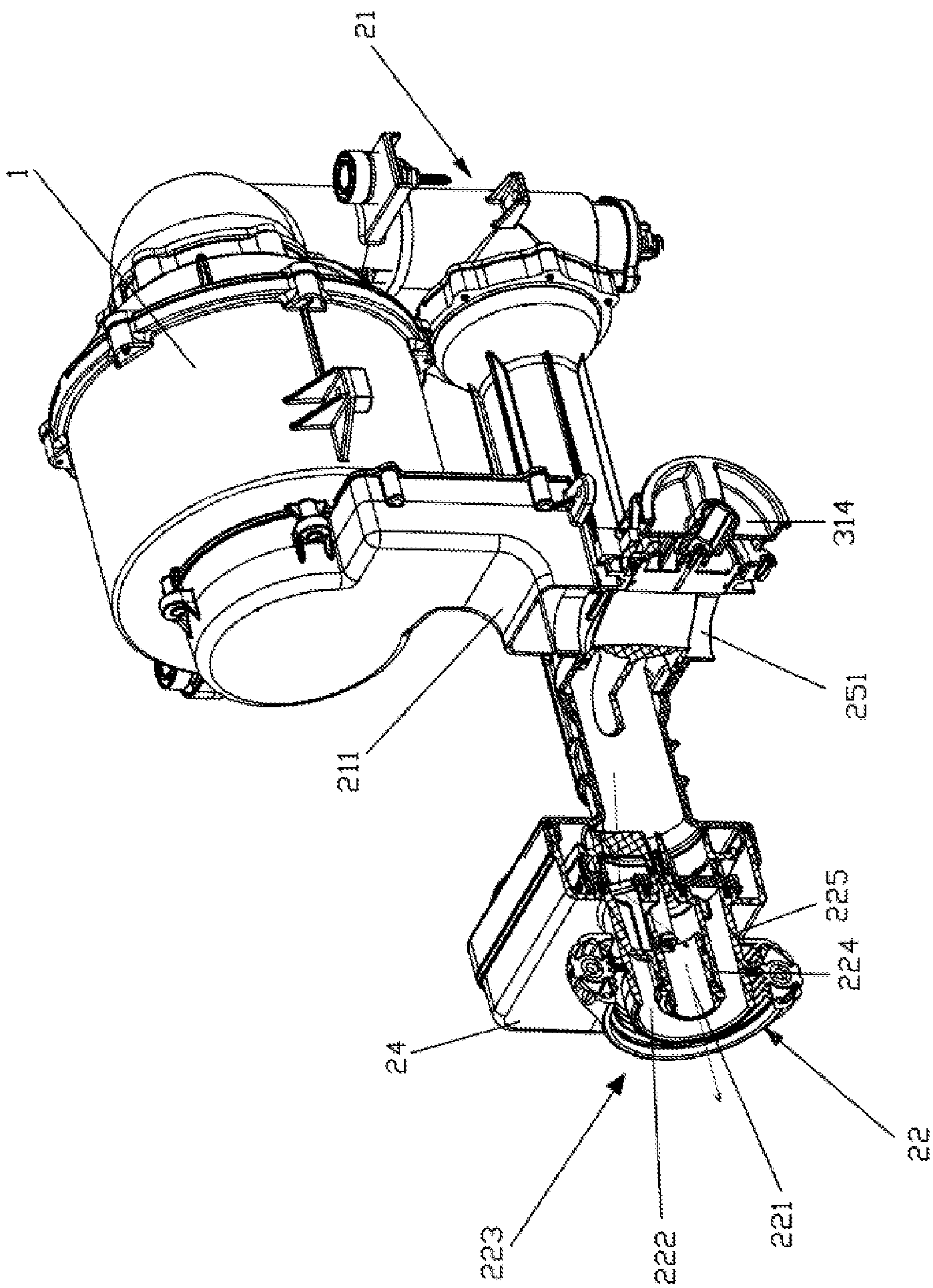
FIG. 7 illustrates a perspective view of the air passage system with a section of an exterior of the passage system removed, illustrating a first one of the two first air connecting openings being open in Embodiment 1.
Figure 8:
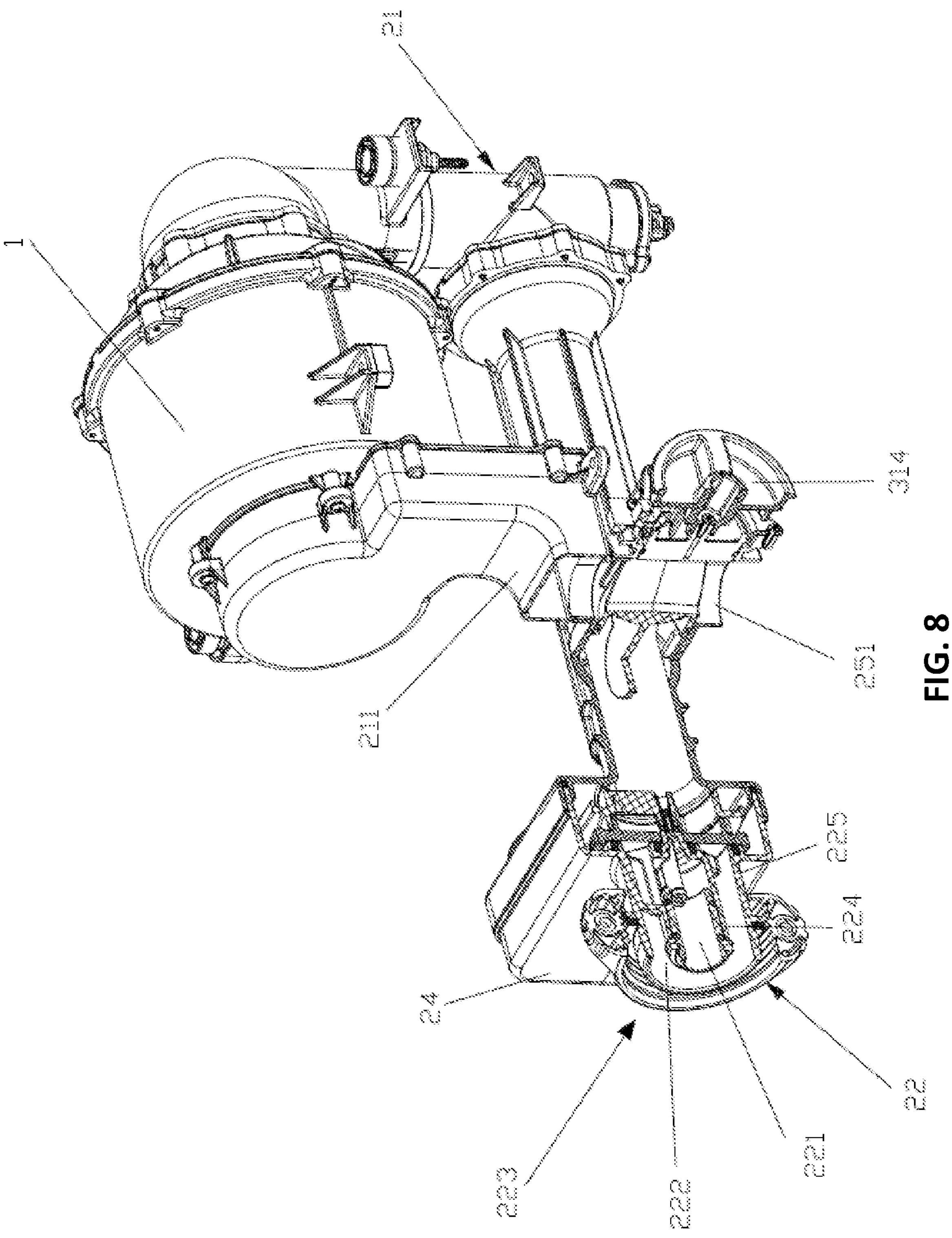
FIG. 8 illustrates a perspective view of the air passage system with a section of an exterior of the passage system removed, illustrating the two first air connecting openings being closed in Embodiment 1.
Figure 9:
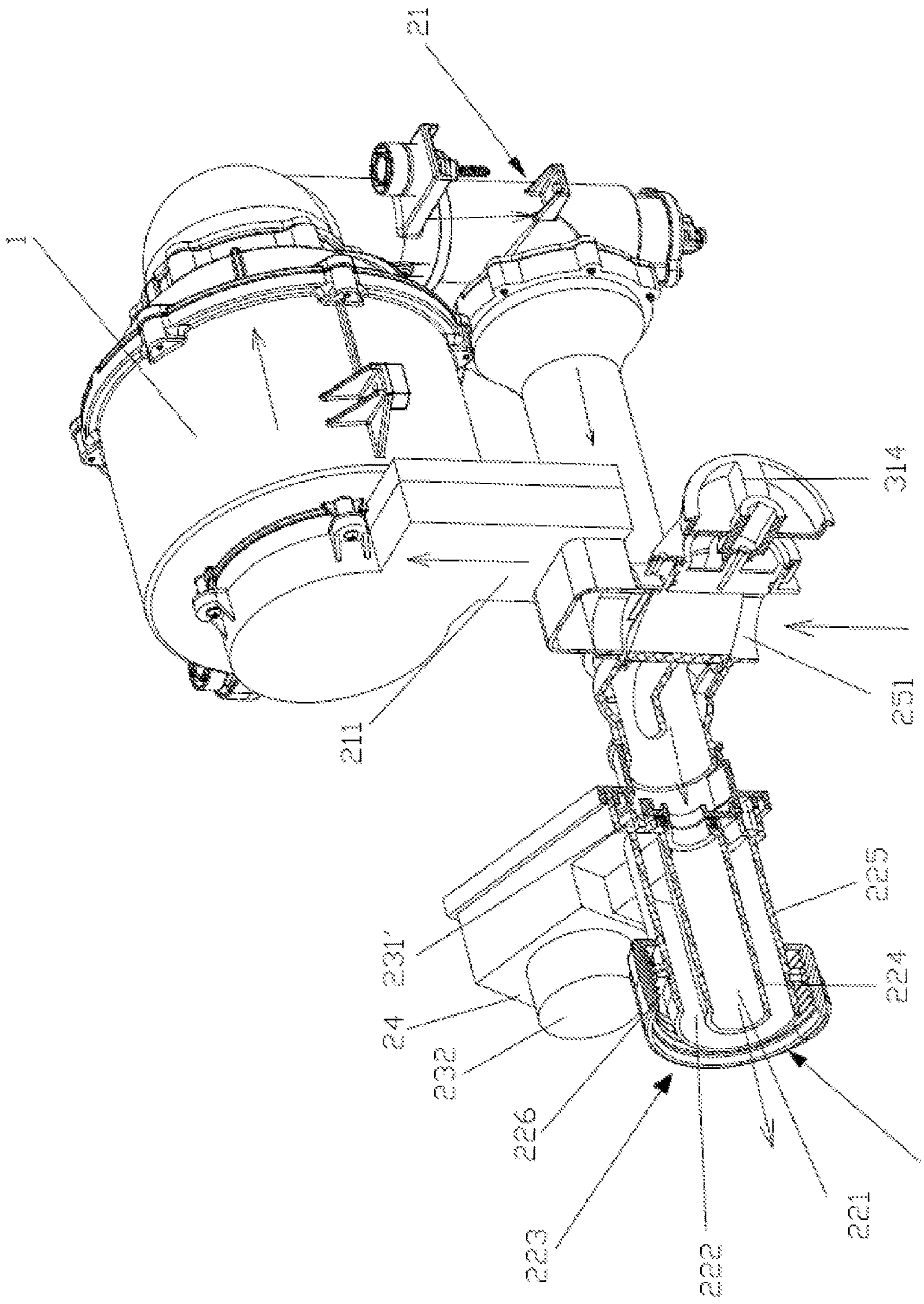
FIG. 9 illustrates a first perspective view of the air passage system with a section of an exterior of the passage system removed when an air passage unit is in an inflated state in Embodiment 2.
Figure 10:
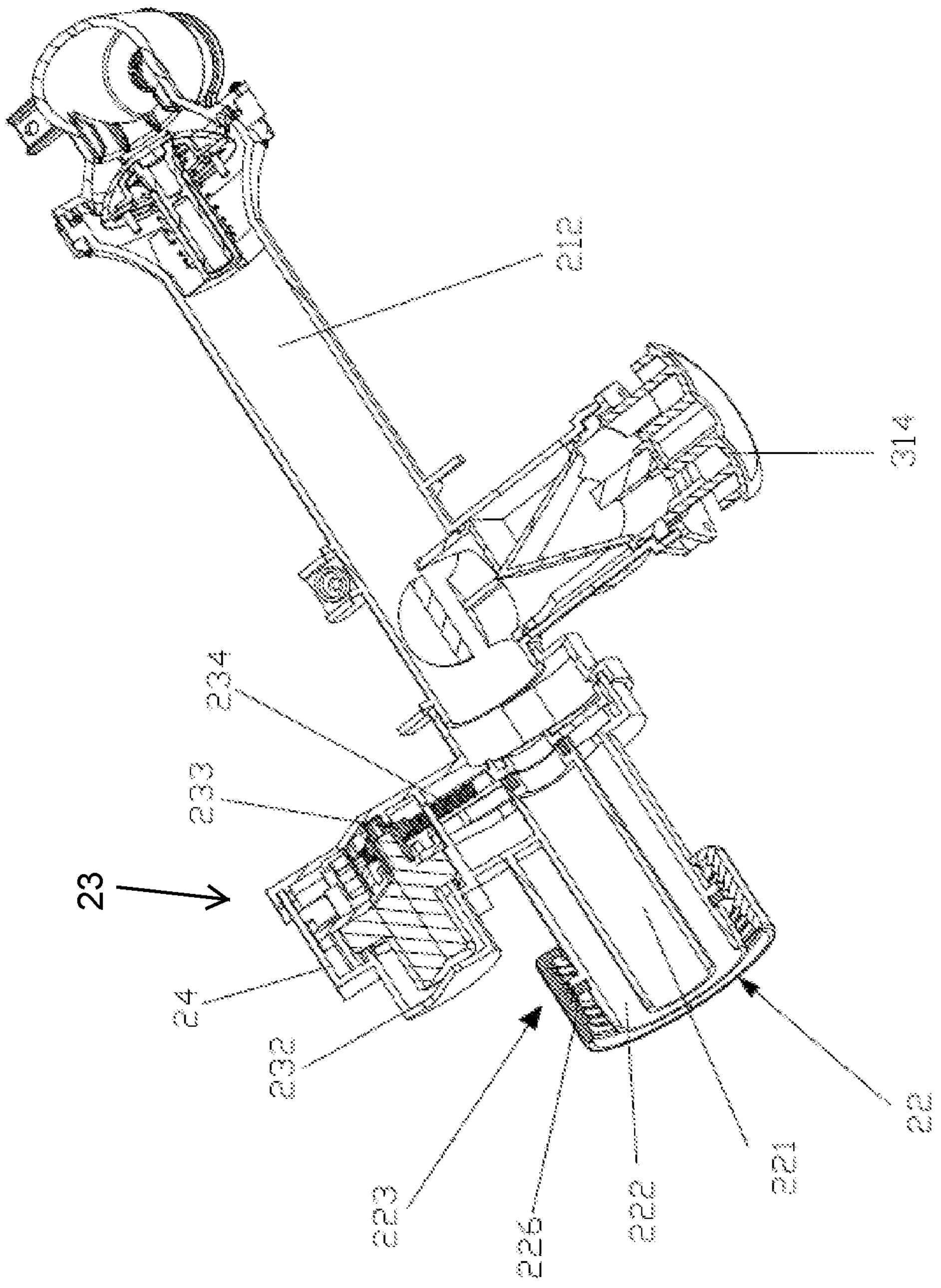
FIG. 10 illustrates a second perspective view of the air passage system with a section of an exterior of the passage system removed when the air passage unit is in the inflated state in Embodiment 2.
Figure 11:
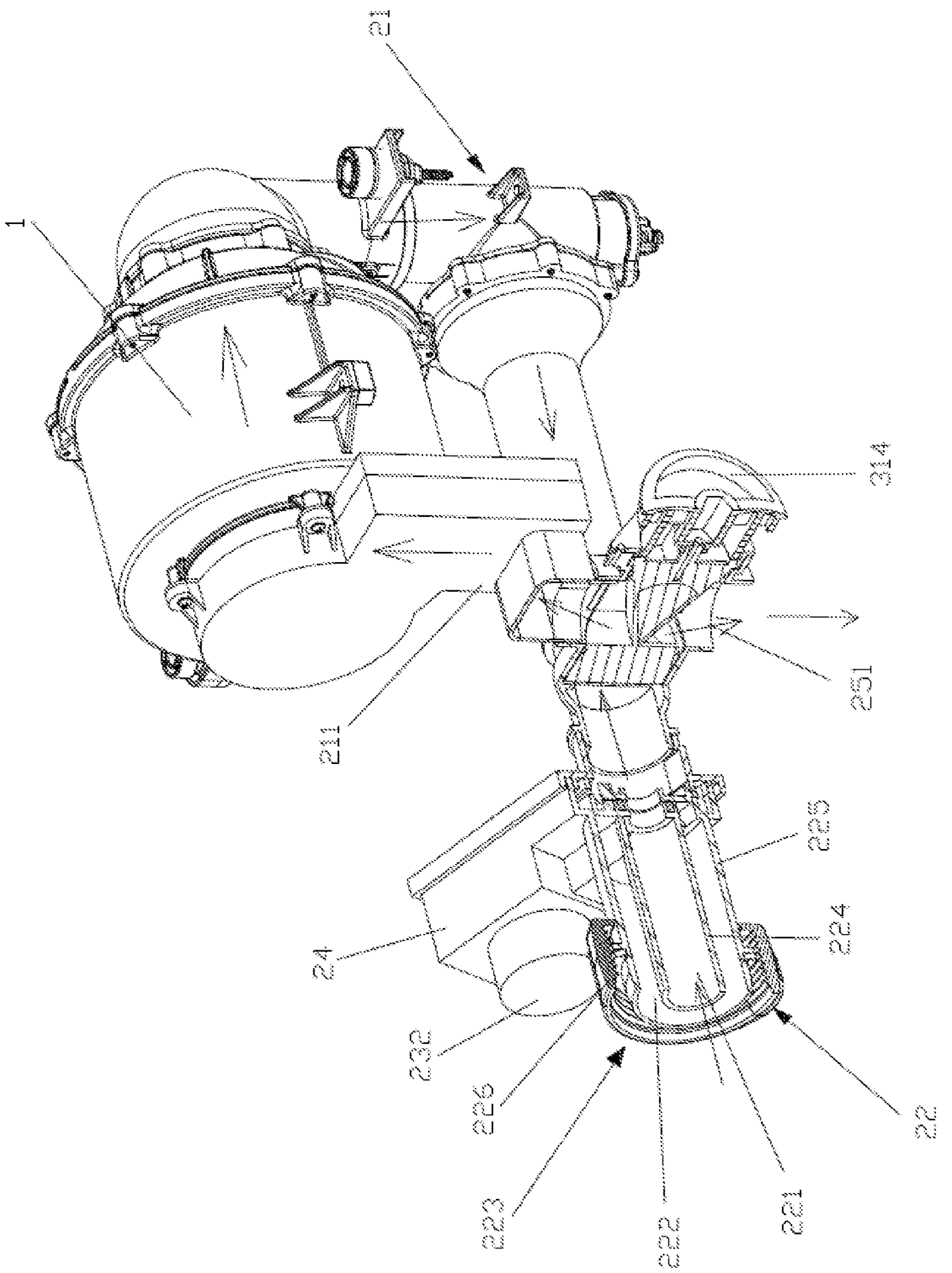
FIG. 11 illustrates a first perspective view of the air passage system with a section of an exterior of the passage system removed when the air passage unit is in an exhausted state in Embodiment 2.
Figure 12:
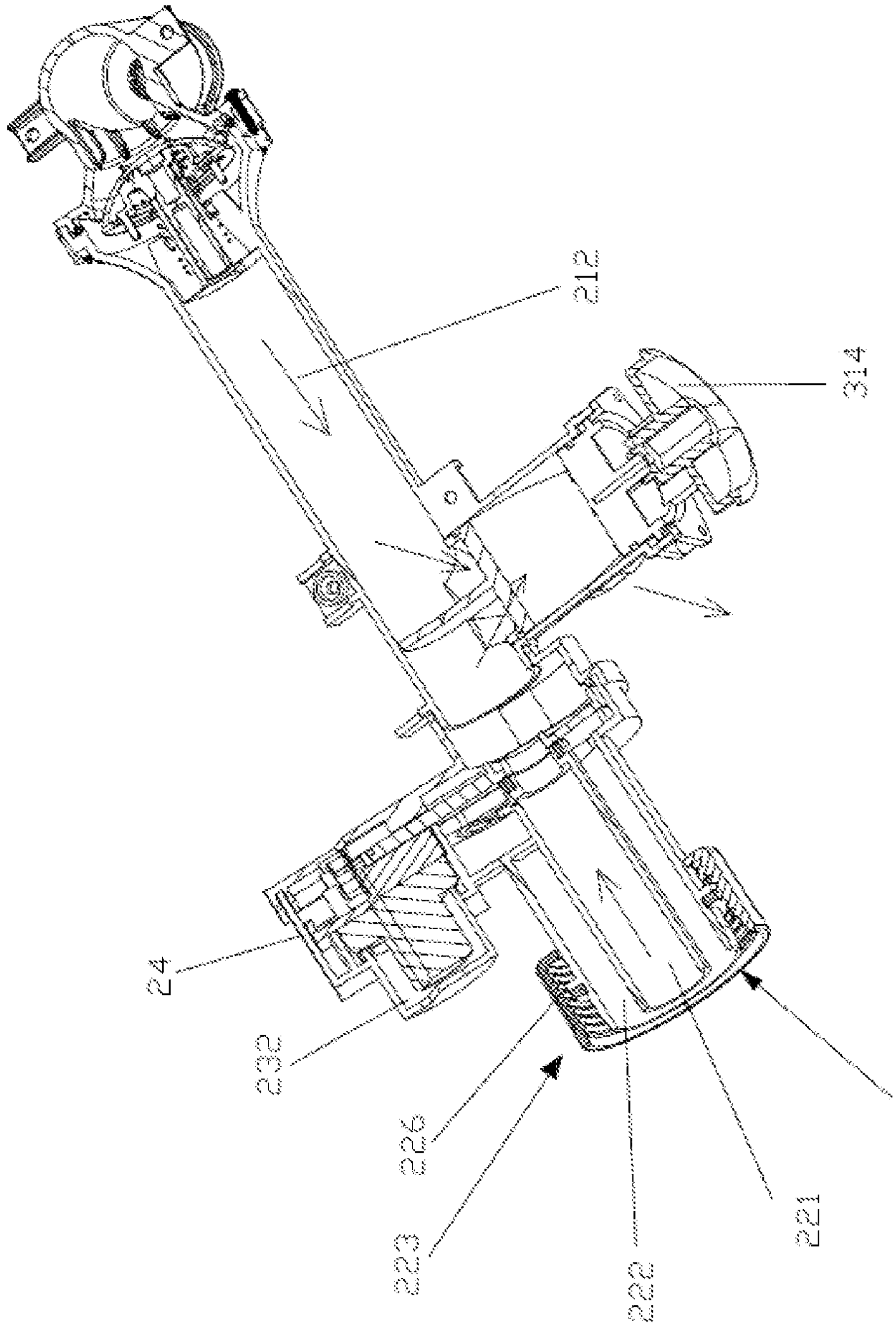
FIG. 12 illustrates a second perspective view of the air passage system with a section of an exterior of the passage system removed when the air passage unit is in the exhausted state in Embodiment 2.

The present disclosure will be further described below in combination with the accompanying drawings and embodiments.

Embodiment 1

Referring to FIGS. 1-8, an air passage system for a massaging pool (also known as a spa) comprises an air pump 1 and an air passage unit 2, and the air passage unit 2 comprises an air passing portion 21, a first air connecting portion 22, and a switching valve 23. The first air connecting portion 22 comprises two first air connecting openings 221, 222 configured to be in communication with the air passing portion 21 and a first fastening structure 223 configured to be detachably connected to the massaging pool, the air pump 1 is connected to the air passing portion 21, and the switching valve 23 cooperates with the air passing portion 21 and the two first air connecting openings 221, 222 to at least switch the two first air connecting openings 221, 222 to be alternatively in communication with the air passing portion 21. In this way, the air passage system of the present disclosure can be used with a single air pump to both supply air to the air cavity of a massaging pool (e.g., through first air connecting opening 221) and to the pool cavity to create bubbles (e.g., through first air connecting opening 222). The two first air connecting openings 221, 222 are disposed on the first fastening structure 223 so as to enable the two first air connecting openings 221, 222 to be synchronously connected to or detached from the massaging pool through the first fastening structure 223 being connected to or detached from the massaging pool. By assembling and disassembling the first fastening structure 223, the two first air connecting openings 221, 222 can be synchronously connected to or detached from the massaging pool, so that the two first air connecting openings 221, 222 can be connected or disconnected through a single operation step, which improves assembly efficiency, convenience, and accuracy.

The first fastening structure 223 comprises a first joint portion, and the first joint portion comprises an inner joint 224 and an outer joint 225 sleeved outside of the inner joint 224. The inner joint 224 defines a first one 221 of the two first air connecting openings 221, 222, a second one 222 of the two first air connecting openings 221, 222 is defined by a gap between the inner joint 224 and the outer joint 225, and the two first air connecting openings 221, 222 are fixedly connected to each other. The first fastening structure 223 further comprises an outer fastening sleeve 226 configured to be connected to or detached from the massaging pool, and the first joint portion is connected to or detached from the massaging pool through the outer fastening sleeve 226 being connected to or detached from the massaging pool. Specifically, the outer fastening sleeve 226 is a sleeve having internal threads, the outer fastening sleeve 226 comprises a first protruding ring, the outer joint 225 comprises a second protruding ring, and the first protruding ring is configured to abut the second protruding ring. The first joint portion is fixedly connected to the massaging pool through the internal threads to enable the two first air connecting openings 221, 222 to be respectively in communication with two second air connecting openings of the massaging pool.

The first joint portion and the air passing portion 21 are fixedly connected to each other, and a portion at which the first joint portion is connected to the air passing portion 21 defines a mounting seat 24. The switching valve 23 comprises a valve core 231 configured to be rotatably connected to the air passage unit, an operating member 232, and a transmission gear 233, the valve core 231 cooperates with the air passing portion 21 and the first air connecting portion 22 to switch the two first air connecting openings 221, 222 to be alternatively in communication with the air passing portion 21, and the operating member 232 and the transmission gear 233 are coaxially connected to each other and are rotatably connected to the mounting seat 24. The valve core 231 comprises gear teeth that engage the transmission gear 233, and the operating member 232 rotates to drive the transmission gear 233 to rotate so as to drive the valve core to rotate, which improves the convenience and reliability of rotation. According to needs, the mounting seat 24 comprises a first housing fixedly connected to the first air connecting portion 22 and a second housing fixedly connected to the air passing portion 21, and the first housing and the second housing are fixedly connected to each other. The first housing comprises two air dividing openings respectively in communication with the two first air connecting openings 221, 222, a pressing lid 241 is disposed in the second housing, and the pressing lid 241 and the first housing define an air dividing chamber in which the valve core 231 is disposed. The valve core 231 is fixedly disposed with a sealing gasket 2311 sealingly connected to the first housing, and the valve core 231 rotates to enable the two air dividing openings to be alternatively in communication with the air dividing chamber to achieve switching.

According to needs, the air passage unit further comprises a control mechanism 3, and the air passing portion 21 comprises a first air passing passage 211 and a second air passing passage 212. The control mechanism 3 cooperates with the first air passing passage 211, the second air passing passage 212, and the first air connecting portion 22, so that the air passage unit is configured to be alternatively in an inflated state or an exhausted state which is configured to be selected through the control mechanism 3. When the air passage unit is in the inflated state, the first passing passage 211 is in communication with external air, and the second air passing passage 212 is in communication with the first air connecting portion 22, so as to enable an air cavity of the massaging pool to be inflated through the first one 221 of the two air connecting opening 221, 222 or enable a pool cavity of the massaging pool to be supplied with air through the second one 222 of the two air connecting openings 221, 222 to generate massage bubbles. When the air passage unit is in the exhausted state, the first air connecting portion 22 is in communication with the first air passing passage 211 through the control mechanism 3, and the second air passing passage 212 is in communication with the external air through the control mechanism 3, so as to exhaust the air in the air cavity of the massaging pool. Specifically, the control mechanism 3 comprises a rotating seat 31 and an on-off portion 32 fixedly connected to the rotating seat 31, the rotating seat 31 comprises an air inlet path 311, an air exhaust path 313, and an air connecting path 312, and the on-off portion 32 is disposed between the first air connecting portion 22 and the second air passing passage 212 to control a turning ON and OFF of air between the first air connecting portion 22 and the second air passing passage 212. A mounting chamber is defined between the air passing portion 21 upstream of the second air passing passage 212 and the second air passing passage 212. Specifically, a portion of the air passing portion is fixedly connected to a portion of the second air passing passage 212 to define the mounting seat, and the mounting seat 24 defines the mounting chamber. A periphery of a chamber opening of the mounting chamber extends outward to define a mounting surrounding wall 25, the rotating seat 31 is rotatably connected to the mounting surrounding wall 25, the on-off portion 32 is inserted into the mounting chamber, and the rotating seat 31 rotates to control the air passage unit to be alternatively in the inflated state or the exhausted state. The air inlet path 311 penetrates through the rotating seat 31, and an outer wall of the rotating seat 31 comprises two notches respectively defining the air exhaust path 313 and the air connecting path 312. An end port of the first air passing passage 211 penetrates through the mounting surrounding wall 25, the mounting surrounding wall 25 comprises an air connecting opening 251 penetrating therethrough, and the end port of the first air passing passage 211 and air connecting opening 251 are located on two positions of the mounting surrounding wall 25 which are symmetrical along a radial direction of the mounting surrounding wall 25 in a symmetrical manner (e.g., located on upside and downside of the mounting surrounding wall 25). The air pump 1 is connected to the first air passing passage 211 and the second air passing passage 212. According to needs, a distal end of the rotating seat 31 is fixedly connected with a rotating knob 314.

When the air passage unit is in the inflated state, the air connecting opening 251 is in communication with the first air passing passage 211 through the air inlet path 311, the rotating seat 31 seals the chamber opening of the mounting chamber, the second air passing passage 212 is in communication with the first air connecting portion 22 due to the on-off portion being open, the air pump 1 sucks the external air from the air connecting opening 251, and the external air sucked by the air pump 1 successively passes through the air inlet path 311, the first air passing passage 211, the air pump 1, the second air passing passage 212, and the first air connecting portion 22 to be supplied to the air cavity of the massaging pool. When the air passage unit is in the exhausted state, the first air connecting portion 22 is in communication with the first air passing passage 211 through the air connecting path 312, the second air passing passage 212 is in communication with the air connecting opening 251 through the air exhaust path 313, the on-off portion is closed to achieve blocking, and the air in the air cavity of the massaging pool successively passes through the first air connecting portion 22, the air connecting path 312, the first air passing passage 211, the air pump 1, the second air passing passage 212, the air exhaust path 313, and the air connecting opening 251 to achieve exhausting. The inflated state and the exhausted state can refer to air passage illustrations in Embodiment 2. The air pump 1 does not need to change a direction of rotation using the structure abovementioned, as long as being controlled by the control mechanism to achieve exhausting or inflating.

In this embodiment, the control mechanism 3 has integrated to achieve inflating of the air cavity, inflating of massage bubbles, and exhausting of the air cavity to facilitate user use. However, according to needs, the control mechanism may not be provided, so that only the air cavity inflation and the massage bubbles inflation are assembled together, and the massage pool is collapsed by the natural exhaust method.

The massaging pool comprises the air passage system and a pool body. The air cavity is defined within the pool body, and the pool body comprises a first one of the two second air connecting openings. The pool body surrounds to define the pool cavity, and the pool body comprises a second one of the two second air connecting openings configured to be in communication with the pool cavity and cooperating with the pool cavity to generate the massage bubbles. The pool body comprises a second fastening structure, and the two second air connecting openings are disposed on the second fastening structure. The two first air connecting openings are synchronously respectively connected to or detached from the two second air connecting openings through the second fastening structure being connected to or detached from the first fastening structure.

Embodiment 2

Referring to FIGS. 9-12, this embodiment is similar to the embodiment 1 but has the differences described below. The switching valve 23 comprises a valve core 231' configured to slide in the air passage unit, and the valve core slides to achieve switching abovementioned. Specifically, the switching valve 23 comprises the valve core 231', the operating member 232, and the transmission gear 233. The valve core 231' cooperates with the air passing portion 21 and the first air connecting portion 22 to switch the two first air connecting openings 221, 222 to be alternatively in communication with the air passing portion 21, and the operating member 232 and the transmission gear 233 are coaxially fixedly connected to each other and are configured to rotatably connected to the mounting seat 24. The valve core 231' is disposed with a rack that is located outside thereof, the transmission gear engages the rack, the operating member 232 drives the transmission gear to rotate, and the valve core 231' correspondingly slides through the transmission gear being operatively coupled to the rack. The gear fit facilitates the layout, improves the convenience of rotation, and improves the reliability of rotation.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

Figure 13:
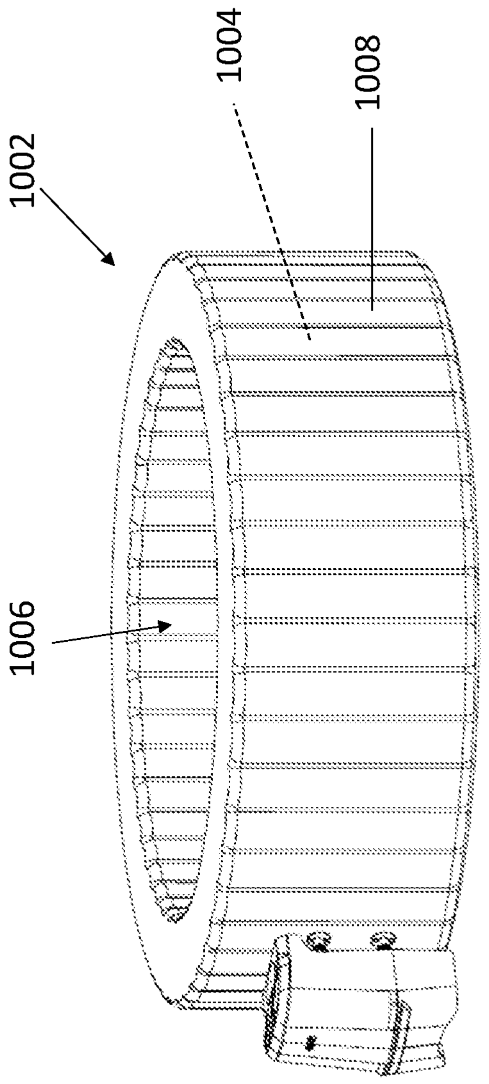
FIG. 13 is a perspective view of a spa, which can also be termed a massaging pool.
Figure 14:
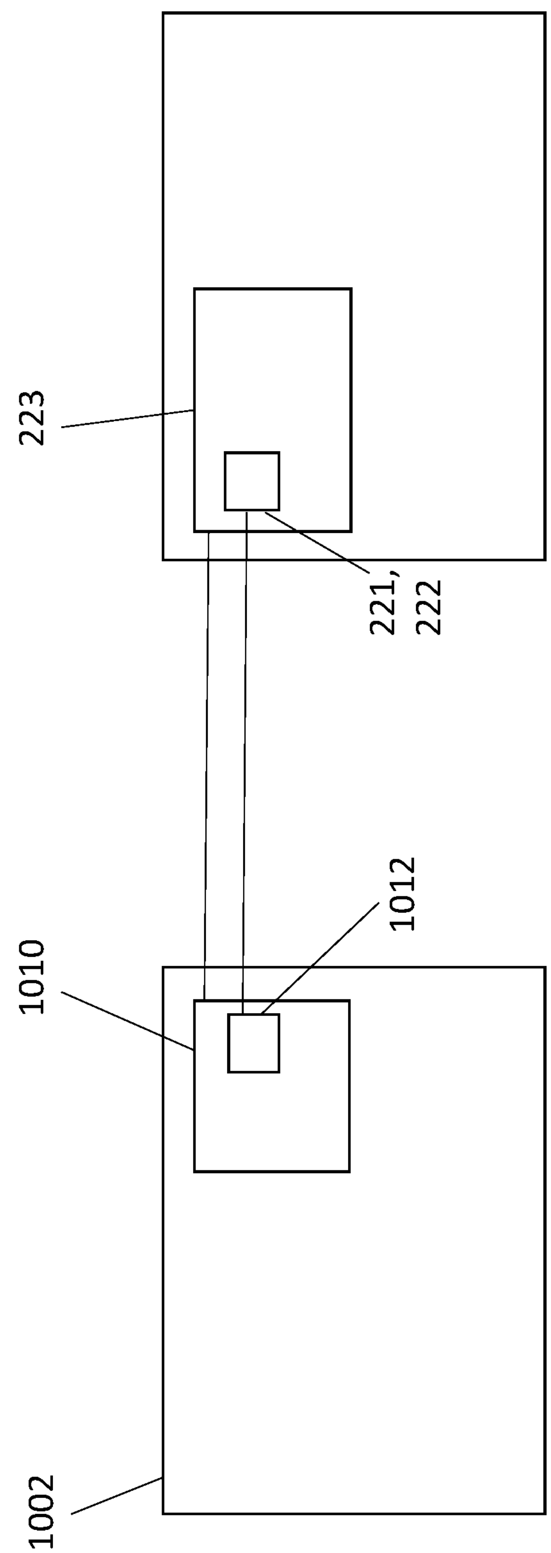
FIG. 14 is a schematic illustration of a spa and air passage system of the present disclosure.

The various embodiments of an air passage system disclosed herein are useable with spa 1002 (also known as a massaging pool) shown in FIGS. 13 and 14. Massaging pool 1002 comprises an inflatable structure having air cavity 1004 into which air is pumped by one of the air passage systems of the present disclosure. Massaging pool 1002 also includes pool cavity 1006 defined by the pool body, which includes upstanding wall 1008 surrounding pool cavity 1006. Upstanding wall 1008 is formed when massaging pool 1002 is inflated. Pool cavity 1006 accommodates water and occupants.

Referring to FIG. 14, massaging pool 1002 connects to any of the air passage systems disclosed herein, with first fastening structure 223 selectively secured to second fastening structure 1010. In exemplary embodiments, second fastening structure 1010 defines a threaded connector matable with first fastening structure 223 to seal first air connecting openings 221, 222 to second air connecting openings 1012 for fluid communication therebetween. Specifically, first air connecting opening 221 is placed in fluid communication with air cavity 1004 via a first one of second air connecting openings 1012 to selectively inflate and deflate massaging pool 1002, as described above, and second air connecting opening 222 is placed in fluid communication with pool cavity 1006 via a second one of second air connecting openings 1012 to generate massaging bubbles in a quantity of water contained in pool cavity 1006, when desired. Second air connecting openings 1012 are disposed on second fastening structure 1010 in similar fashion to first air connecting openings 221, 222 being disposed on first fastening structure 223, as described above. Second air connecting openings 1012 are disposed on second fastening structure 1010 so as to enable the two first air connecting openings 221, 222 to be synchronously connected to or detached from second air connecting openings 1012 through the first fastening structure 223 being connected to or detached from the second fastening structure 1010 and thereby connected to or detached from the massaging pool.

The present disclosure is meant to cover combinations of features from the various embodiments. That is, certain features of one embodiment may be combined with other features of another embodiment in accordance with the present disclosure.

What is claimed is:

1. An air passage unit for a massaging pool, comprising:
an air passing portion,
a first air connecting portion, and
a first fastening structure, wherein:
the first air connecting portion comprises two first air connecting openings configured to be in communication with the air passing portion, wherein a first one of the two first air connecting openings is sleeved on a second one of the two first connecting openings,
the first fastening structure is configured to be detachably connected to the massaging pool, and
the two first air connecting openings are disposed on the first fastening structure so as to enable the two first air connecting openings to be synchronously connected to or detached from the massaging pool through the first fastening structure being connected to or detached from the massaging pool.

2. The air passage unit for the massaging pool according to claim 1, comprising:
a switching valve, wherein:
the switching valve cooperates with the air passing portion and the two first air connecting openings to provide a switching of the two first air connecting openings to be alternatively in communication with the air passing portion.

3. The air passage unit for the massaging pool according to claim 2, wherein:
the switching valve comprises a valve core configured to be slidingly connected to the air passage unit, and
the valve core is configured to slide to achieve the switching.

4. The air passage unit for the massaging pool according to claim 3, comprising:
a mounting seat, wherein:
the switching valve comprises an operating member, and
the operating member is connected to the mounting seat and arranged to drive the valve core.

5. The air passage unit for the massaging pool according to claim 2, wherein:
the switching valve comprises a valve core configured to be rotatably connected to the air passage unit, and
the valve core is configured to rotate to achieve the switching.

6. The air passage unit for the massaging pool according to claim 1, wherein:

the two first air connecting openings are fixedly connected to each other.

7. The air passage unit for the massaging pool according to claim 1, wherein:
the first fastening structure comprises a first joint portion,
the first joint portion comprises an inner joint and an outer joint sleeved outside of the inner joint,
the inner joint defines a first one the second of the two first air connecting openings, and
a second one the first of the two first air connecting openings is defined by a gap between the inner joint and the outer joint.

8. The air passage unit for the massaging pool according to claim 7, wherein:
the first fastening structure further comprises an outer fastening sleeve configured to be connected to or detached from the massaging pool, and
the first joint portion is configured to be connected to or detached from the massaging pool through the outer fastening sleeve being connected to or detached from the massaging pool.

9. The air passage unit for the massaging pool according to claim 7, comprising:
a switching valve, and
a mounting seat, wherein:
the switching valve comprises a valve core and an operating member,
the switching valve cooperates with the air passing portion and the two first air connecting openings to provide a switching of the two first air connecting openings to be alternatively in communication with the air passing portion,
the operating member is operatively coupled to the valve core to drive the valve core,
the first joint portion and the air passing portion are fixedly connected to each other,
a portion at which the first joint portion is connected to the air passing portion defines the mounting seat, and
the operating member is connected to the mounting seat.

10. The air passage unit for the massaging pool according to claim 1, wherein:
the first fastening structure comprises a first joint portion,
the first joint portion comprises two joints juxtapositionally secured with each other, and
the two joints respectively define the two first air connecting openings.

11. The air passage unit for the massaging pool according to claim 10, wherein:
the first fastening structure comprises an outer joint, and
the two joints are fixedly disposed in the outer joint.

12. The air passage unit for the massaging pool according to claim 1, comprising:
a control mechanism, wherein:
the air passing portion comprises a first air passing passage and a second air passing passage,
the control mechanism cooperates with the first air passing passage, the second air passing passage, and the first air connecting portion, so that the air passage unit is configured to be alternatively in an inflated state or an exhausted state which is configured to be selected through the control mechanism,
when the air passage unit is in the inflated state:
the first air passing passage is in communication with external air, and
the second air passing passage is in communication with the first air connecting portion, and
when the air passage unit is in the exhausted state:

the first air connecting portion is in communication with the first air passing passage through the control mechanism, and the second air passing passage is in communication with the external air through the control mechanism.

13. The air passage unit for the massaging pool according to claim 12, wherein:

the control mechanism comprises an air inlet path, an air exhaust path, and an air connecting path, when the air passage unit is in the inflated state:

the first air passing passage is in communication with the external air through the air inlet path, and the second air passing passage is in communication with the first air connecting portion, and when the air passage unit is in the exhausted state:

the first air connecting portion is in communication with the first air passing passage through the air connecting path, and the second air passing passage is in communication with the external air through the air exhaust path.

14. The air passage unit for the massaging pool according to claim 13, wherein:

the control mechanism comprises an on-off portion, the on-off portion is disposed between the first air connecting portion and the second air passing passage to control a turning ON and OFF of air between the first air connecting portion and the second air passing passage, when the air passage unit is in the inflated state, the on-off portion is open to enable the first air connecting portion to be in communication with the second air passing passage, and when the air passage unit is in the exhausted state, the on-off portion is closed to block the first air connecting portion from being in communication with the second air passing passage.

15. The air passage unit for the massaging pool according to claim 14, wherein:

the control mechanism comprises a rotating seat, the on-off portion is fixedly connected to the rotating seat, the rotating seat comprises the air inlet path penetrating therethrough, and an outer wall of the rotating seat comprises two notches respectively defining the air exhaust path and the air connecting path.

16. The air passage unit for the massaging pool according to claim 15, comprising:

a mounting chamber, wherein:

the mounting chamber is defined between the air passing portion and the second air passing passage, a periphery of a chamber opening of the mounting chamber extends outward to define a mounting surrounding wall, the rotating seat is rotatably connected to the mounting surrounding wall, the on-off portion is inserted into the mounting chamber, an end port of the first air passing passage penetrates through the mounting surrounding wall, the mounting surrounding wall comprises an air connecting opening penetrating therethrough, the rotating seat rotates to control the air passage unit to be alternatively in the inflated state or the exhausted state, when the air passage unit is in the inflated state:

the air connecting opening is in communication with the first air passing passage through the air inlet path, and the rotating seat seals the chamber opening of the mounting chamber, and when the air passage unit is in the exhausted state:

the first air connecting portion is in communication with the first air passing passage through the air connecting path, and the second air passing passage is in communication with the air connecting opening through the air exhaust path.

17. The air passage unit for the massaging pool according to claim 16, wherein:

the end port of the first air passing passage and air connecting opening are located on two positions of the mounting surrounding wall which are symmetrical along a radial direction of the mounting surrounding wall.

18. An air passage system for a massaging pool, comprising:

an air pump, and the air passage unit according to claim 12, wherein:

the air pump is connected to the first air passing passage and the second air passing passage.

19. An air passage system for a massaging pool, comprising:

an air pump, and the air passage unit according to claim 1, wherein:

the air pump is connected to the air passing portion.

20. A pool body for a massaging pool, comprising:

an air cavity, a pool cavity, and two second air connecting openings, and a second fastening structure, wherein:

the air cavity is defined within the pool body, a first one of the two second air connecting openings is configured to be in communication with the air cavity, the pool body surrounds to define the pool cavity, a second one of the two second air connecting openings is configured to be in communication with the pool cavity and cooperates with the pool cavity to generate the massage bubbles, the two second air connecting openings are disposed on the second fastening structure, and the two second air connecting openings are synchronously respectively connected to or detached from an air passage system through the second fastening structure being connected to or detached from the air passage system.

21. A massaging pool, comprising:

a pool body, an air pump, and the air passage unit according to claim 1, wherein:

an air cavity is defined within the pool body, the pool body comprises a first one of two second air connecting openings configured to in communication with the air cavity, the pool body surrounds to define a pool cavity, the pool body comprises a second one of the two second air connecting openings configured to be in communication with the pool cavity and cooperating with the pool cavity to generate the massage bubbles, the air pump is connected to the air passing portion, the pool body comprises a second fastening structure, the two second air connecting openings are disposed on the second fastening structure, and the two first air connecting openings are synchronously respectively connected to or detached from the two second air connecting openings through the second fastening structure being connected to or detached from the first fastening structure.

22. An air passage system for a massaging pool, comprising:

an air pump, and an air passage unit, wherein:

the air passage unit comprises an air passing portion, a first air connecting portion, and a control mechanism, the air passing portion comprises a first air passing passage and a second air passing passage, the air pump is connected to the first air passing passage and the second air passing passage, the control mechanism cooperates with the first air passing passage, the second air passing passage, and the first air connecting portion, so that the air passage unit is configured to be alternatively in an inflated state or an exhausted state which is configured to be selected through the control mechanism, when the air passage unit is in the inflated state:

the first passing passage is in communication with external air, and the second air passing passage is in communication with the first air connecting portion, and when the air passage unit is in the exhausted state:

the first air connecting portion is in communication with the first air passing passage through the control mechanism, and the second air passing passage is in communication with the external air through the control mechanism.

23. The air passage system for the massaging pool according to claim 22, wherein:

the control mechanism comprises an air inlet path, an air exhaust path, and an air connecting path, when the air passage unit is in the inflated state:

the first air passing passage is in communication with the external air through the air inlet path, and the second air passing passage is in communication with the first air connecting portion, and when the air passage unit is in the exhausted state:

the first air connecting portion is in communication with the first air passing passage through the air connecting path, and the second air passing passage is in communication with the external air through the air exhaust path.

24. The air passage system for the massaging pool according to claim 23, wherein:

the control mechanism comprises an on-off portion, the on-off portion is disposed between the first air connecting portion and the second air passing passage to control a turning ON and OFF of air between the first air connecting portion and the second air passing passage, when the air passage unit is in the inflated state, the on-off portion is open to enable the first air connecting portion to be in communication with the second air passing passage, and when the air passage unit is in the exhausted state, the on-off portion is closed to block the first air connecting portion from being in communication with the second air passing passage.

25. The air passage system for the massaging pool according to claim 24, wherein:

the control mechanism comprises a rotating seat, the on-off portion is fixedly connected to the rotating seat, the rotating seat comprises the air inlet path penetrating therethrough, and an outer wall of the rotating seat comprises two notches respectively defining the air exhaust path and the air connecting path.

26. The air passage system for the massaging pool according to claim 25, comprising:

a mounting chamber, wherein:

the mounting chamber is defined between the air passing portion and the second air passing passage, a periphery of a chamber opening of the mounting chamber extends outward to define a mounting surrounding wall, the rotating seat is rotatably connected to the mounting surrounding wall, the on-off portion is inserted into the mounting chamber, an end port of the first air passing passage penetrates through the mounting surrounding wall, the mounting surrounding wall comprises an air connecting opening penetrating therethrough, the rotating seat rotates to control the air passage unit to be alternatively in the inflated state or the exhausted state, when the air passage unit is in the inflated state:

the air connecting opening is in communication with the first air passing passage through the air inlet path, and the rotating seat seals the chamber opening of the mounting chamber, and when the air passage unit is in the exhausted state:

the first air connecting portion is in communication with the first air passing passage through the air connecting path, and the second air passing passage is in communication with the air connecting opening through the air exhaust path.

27. The air passage system for the massaging pool according to claim 26, wherein:

the end port of the first air passing passage and air connecting opening are located on two positions of the mounting surrounding wall which are symmetrical along a radial direction of the mounting surrounding wall.

28. The air passage system for the massaging pool according to claim 22, wherein:

the first air connecting portion comprises a first air connecting opening.

29. A massaging pool, comprising:

a pool body, and an air passage system, wherein:

an air cavity is defined within the pool body, the pool body comprises a second air connecting openings, the air passage system comprises an air pump, and an air passage unit, the air passage unit comprises an air passing portion, a first air connecting portion, and a control mechanism, the air passing portion comprises a first air passing passage and a second air passing passage, the air pump is connected to the first air passing passage and the second air passing passage, the control mechanism cooperates with the first air passing passage, the second air passing passage, and the first air connecting portion, so that the air passage unit is configured to be alternatively in an inflated state or an exhausted state which is configured to be selected through the control mechanism, the first air connecting portion comprises a first air connecting opening, the first air connecting opening is configured to be connected to the second air connecting opening,
when the air passage unit is in the inflated state:
the first passing passage is in communication with external air, and
the second air passing passage is in communication with the first air connecting portion, and
when the air passage unit is in the exhausted state:
the first air connecting portion is in communication with the first air passing passage through the control mechanism, and
the second air passing passage is in communication with the external air through the control mechanism.

* * * * *